Aug. 13, 1935. G. E. CAMPBELL 2,011,547
PUMP VALVE
Filed Aug. 6, 1930 2 Sheets-Sheet 1

Inventor
George E. Campbell
By
Attorney

Aug. 13, 1935.  G. E. CAMPBELL  2,011,547
PUMP VALVE
Filed Aug. 6, 1930   2 Sheets-Sheet 2

Inventor
George E. Campbell
By Vernon E. Hodges
his Attorney

Patented Aug. 13, 1935

2,011,547

UNITED STATES PATENT OFFICE 2,011,547

PUMP VALVE

George E. Campbell, Chattanooga, Tenn., assignor to The Wheland Company, Chattanooga, Tenn., a corporation of Tennessee Application August 6, 1930, Serial No. 473,453

6 Claims. (Cl. 251—144)

This invention relates to an improvement in pump valves, and is designed primarily for use in the mud-end of a duplex reciprocating pump.

The object of the invention is to materially improve the action of pump valves of this character to more effectively seal the communication between the pressure and discharge chambers of the pump, by improving the structure of the valve and its action for this purpose.

Figure 1:
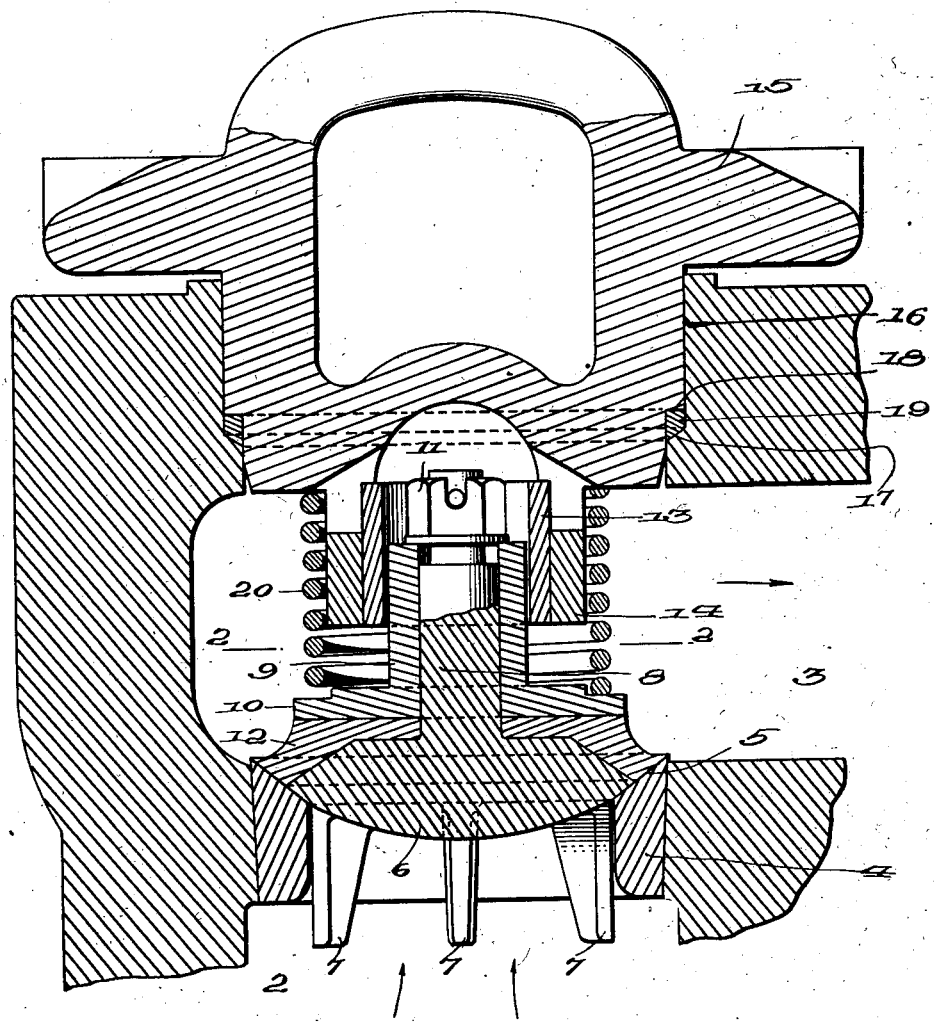
Fig. 1 is a sectional view through the complete valve applied.
Figure 2:
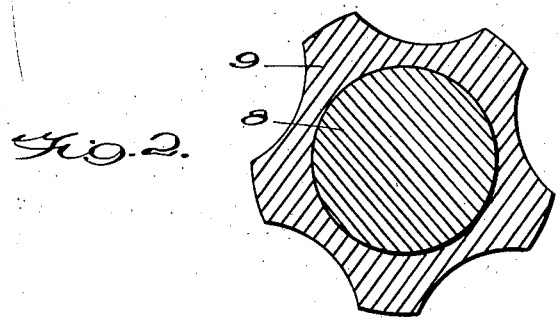
Fig. 2 is a transverse sectional view on the line 2—2 of Fig. 1.

The body of the pump is provided with the pressure chamber 2 and a discharge chamber 3, through which the liquid or fluid is forced under pressure.

Arranged between the chambers 2 and 3 and having a downwardly tapered fit therein is a valve ring 4, which is provided with a valve seat 5, the engaging surface of which is frustro-conical, being at an angle of about 45° with the horizontal.

A valve body 6 is constructed to fit the seat 5 and is guided in its up and down movement by crow-feet 7 carried by the lower face thereof, and which crow-feet fit loosely within the valve ring 4.

The valve body 6 is carried on the lower end of a valve stem 8 received within a fluted sleeve 9 formed integral with and extending upwardly from a valve plate 10. A nut 11 is threaded onto the upper end of the valve stem 8 to hold the valve stem and fluted sleeve 9 together.

A rubber valve insert 12 is interposed between the valve body 6 and the valve plate 10 and has its outer face formed to fit the valve seat 5 as a continuation of the surface of the valve body 6. By tightening the nut 11, the plate 10 is forced down onto the rubber insert 12 not only forcing the rubber insert against the upper face of the valve body 6 but also slightly beyond the face of the valve body to form a rubber cushion seat and by reason of which this rubber forms a perfect water-seal.

The water or mud pressure that the valve must seal off is always applied to the top side of the valve. This water pressure is applied against the exposed rubber insert and is sealed off thereby, the rubber in turn being backed up and strengthened by the valve body 6, resting on its seat in the valve ring 4. The rubber being pliable easily adapts itself to any roughness of the seat and prevents leakage. The rubber insert 12 may be made in other shapes than that shown in the drawings if desired.

The fluted sleeve 9 is slidably mounted for up and down movement in a bushing 13, removably received in a valve guide 14, surrounding the bushing and depending from a valve pot cover 15, which extends into the opening 16 above the valve and through the top of the cover to close this opening. The sleeve 9 is fluted on its external surface so as to reduce friction to a minimum, and it may be removed and replaced when worn.

The bushing 13 is also made removable from its recess in the valve guide 14 in order to be replaced when worn.

An annular shoulder 17 is formed in the opening 16 near the lower end thereof, while a cooperating shoulder 18 is formed about the lower end of the valve pot cover 15, and interposed between these shoulders 17 and 18 is a gasket 19, which is thus located just above the fluid chamber 3 so as to seal off the opening 16 at its lower end.

Heretofore, it has been customary to locate the packing gasket at the extreme top of the valve pot opening, thereby exposing the entire cavity to the high-water pressure and which has been the cause of much damage and breakage. This is obviated by the location of the gasket 19 near the lower end of the opening 16.

The valve 6 is normally pressed downward by a spring 20, which is interposed between the lower end of the valve pot cover 15 and the valve plate 10, the spring being sleeved over the valve guide 14.

Figure 3:
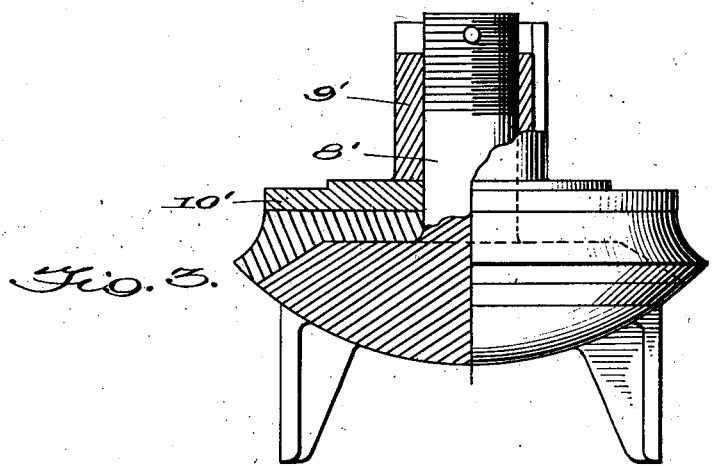
Fig. 3 is a sectional view through the valve of a modification showing the fluted nut and valve plate separate.
Figure 4:
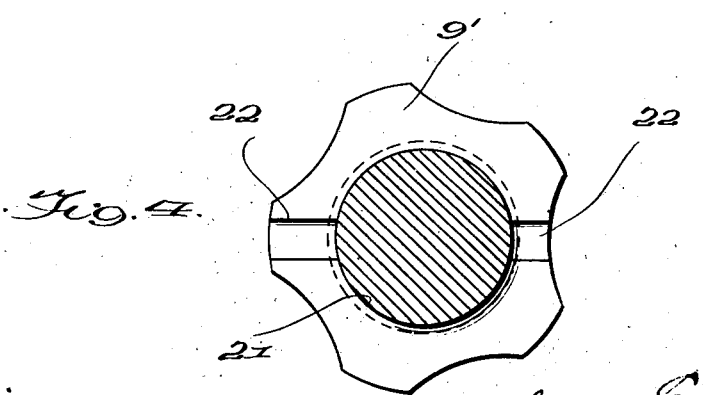
Fig. 4 is a top plan view of the fluted nut of Figure 3.

Various modifications might be made in the valve without departing from the invention, as for instance, the making of the plate 10' separate from the fluted sleeve 9', as shown in Fig. 3. In this form, the upper end of the sleeve is internally threaded as at 21 (see Fig. 4) to be threaded onto the threaded upper end of the valve stem 8'. The nut 11 may thus be dispensed with.

Notches 22 are formed in the upper end of the fluted sleeve 9' to receive a locking pin to secure the fluted sleeve against turning relative to the valve stem.

The action of the piston (not shown) in the pressure chamber 2 causes the mud or water to be pushed upward through the valve ring 4, lifting or pushing the valve body 6 off its seat and forcing this fluid out through the discharge chamber 3. As soon as the piston stops, the weight of the valve as well as the spring 20 returns the valve to its seat, so that it acts as a check-valve. In this up and down movement, the valve is guided by the fluted sleeve 9, acting in the removable bushing 13, but when wear becomes substantial the valve will not properly seat and it is necessary to remove the parts and replace the worn elements. The external fluted surface of the sleeve 9 reduces wear to a minimum between it and the bushing 13, but if they become worn they may be removed and replaced.

The rubber valve insert 12 serves to maintain an effective seating of the valve and a perfect water seal.

I claim:

1. A fluid valve comprising a valve body having the periphery thereof of truncated conical shape, a packing insert of yieldable material abutting against said periphery and having a seat-engaging under surface extending to the periphery of said valve body, and an exposed upper surface extending upwardly from said seat-engaging surface at an angle such that fluid pressure acting thereon presses the under surface against the seat, a valve stem connected with the valve body and extending upwardly therefrom, a sleeve surrounding said valve stem, a plate connected with the lower end of the sleeve and bearing against the upper side of the packing insert, and means for applying pressure on the upper end of the sleeve to hold the packing insert in place.

2. A fluid valve comprising a valve body having a downwardly beveled peripheral surface, a packing insert applied to the beveled peripheral surface thereof, and a plate separate from the valve body bearing against the upper side of the packing insert to hold said insert in place, means for applying pressure on said plate, said packing insert protruding laterally beyond the peripheries of the valve body and plate and having a seat-engaging under surface in said protruding portion, and an upper surface which in cross section is concave, being curved from a point adjoining the seat-engaging surface to a point approximately at the periphery of the plate with the outer edge thereof below the plate, so that top fluid pressure acting thereon forces the insert against its seat.

3. A fluid valve comprising a valve body adapted to cooperate with a valve seat, a packing insert of yieldable material fitted to the upper side of the valve body and having a peripheral flexible feather-edge, and a plate bearing against the upper side of the packing insert, said feather-edge extending horizontally below the plate a substantial distance beyond the peripheries of the valve body and plate in position to be forced against the valve seat by overhead fluid pressure acting on said feather-edge and on the plate, and said feather-edge having a concave upper surface facing the fluid and against which the fluid pressure acts.

4. A fluid valve comprising a valve body adapted to cooperate with a valve seat, and having a truncated-conical periphery, a resilient packing insert fitted to the truncated-conical periphery of the valve body and having a peripheral flexible feather-edge, a plate bearing against the upper side of the packing insert and movable relative to the valve body, and resilient means bearing against the upper side of the plate, the feather-edge of the packing insert extending radially a substantial distance beyond the peripheries of the valve body and plate and having a concave upper surface curved in cross-section approximately from the edge of the plate to the periphery of the feather-edge and against which overhead fluid pressure acts to force said feather-edge against the seat.

5. A fluid valve comprising a valve body having a seat engaging portion, and having an upper surface terminating in a downwardly beveled outer edge portion, said beveled edge extending to the edge of the upper surface, a valve stem connected with the valve body, a plate associated with the valve body and having a lower face extending radially to its periphery, said beveled edge portion of the valve body underlying the outer edge of the plate, a compressible insert disposed between the valve body and the plate and in abutting relation with the beveled edge portion of the valve body to the extreme outer edge thereof, said compressible insert having the outer edge thereof normally in alignment with the seat engaging portion of the valve body and extending downwardly and beyond the peripheries of the valve body and plate, and means connected with the valve stem for applying downward pressure on the insert and cooperating with the beveled portion of the valve body to force the insert laterally beyond the seat engaging portion of the peripheral edge of the valve body.

6. A packing insert adapted to be applied to a valve body of a fluid valve, said packing insert being constructed of yieldable material and having an external peripheral flexible feather edge, said feather edge having a concave upper peripheral surface and a flat plate-engaging top inwardly of said concave surface with the concave surface portion extending to the external periphery and adapted to face the fluid and against which the fluid pressure acts, said packing insert having a seat-engaging lower surface inclined downwardly from the periphery thereof in position to be forced into contact with a seat by the overhead fluid pressure acting on the concave upper surface with its under surface inwardly of said downwardly inclined portion inclined upwardly in position for engaging a tapered valve body.

GEORGE E. CAMPBELL.